(12) United States Patent
El-Kassouf

(10) Patent No.: US 6,283,884 B1
(45) Date of Patent: Sep. 4, 2001

(54) DIFFERENTIAL LOCK ACTUATOR

(75) Inventor: Raji El-Kassouf, Sterling Heights, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/536,116

(22) Filed: Mar. 27, 2000

(51) Int. Cl.[7] .................................................. F16H 48/22
(52) U.S. Cl. ............................................................ 475/86
(58) Field of Search ............................ 192/85 AA; 475/86

(56) References Cited

U.S. PATENT DOCUMENTS

| | | | |
|---|---|---|---|
| 4,934,213 | * | 6/1990 | Niizawa ................................ 475/86 |
| 4,974,714 | * | 12/1990 | Goscenski, Jr. ................. 192/85 AA |
| 5,161,636 | * | 11/1992 | Haupt et al. ........................ 180/248 |
| 5,197,583 | * | 3/1993 | Sakai et al. ........................... 192/35 |
| 5,437,355 | * | 8/1995 | Takagi et al. ....................... 192/18 A |
| 5,520,589 | * | 5/1996 | Dewald et al. ...................... 475/231 |
| 5,865,701 | * | 2/1999 | Sowa et al. ............................ 475/86 |
| 6,077,183 | * | 6/2000 | Tar et al. ............................. 475/231 |

* cited by examiner

Primary Examiner—Dirk Wright
(74) Attorney, Agent, or Firm—Carlson, Gaskey & Olds

(57) ABSTRACT

A vehicle drive axle includes a differential where high pressure is delivered from a stationary source to a rotating source to actuate a differential clutch. The drive axle includes an axle housing, a first rotatable axle shaft for driving a first wheel, and a second rotatable axle shaft for driving a second wheel. The differential controls rotational speed and torque supplied to the first and second axle shafts. The differential clutch is used to selectively lock the axle shafts together when the vehicle experiences unfavorable road conditions. An actuating mechanism is used to control the differential clutch. The actuating mechanism includes a stationary piston actuated by a fluid force and a rotating piston actuated by the stationary piston. This stationary piston moves the rotating piston causing the rotating member to displace a volume of fluid to actuate the differential clutch.

26 Claims, 4 Drawing Sheets

DIFFERENTIAL LOCK ACTUATOR

BACKGROUND OF THE INVENTION

This invention relates to an actuator for a differential locking mechanism where high pressure is delivered from a stationary source to a rotating source to actuate the differential lock.

Vehicle drive axles typically include a pair of axle shafts for driving vehicle wheels. The drive axle uses a differential to control input speed and torque to the axle shafts. Under ideal conditions, when the vehicle is driven along a straight path, the wheels will be turning at approximately the same speed and the torque will be equally split between both wheels. When the vehicle negotiates a turn, the outer wheel must travel over a greater distance than the inner wheel. The differential allows the inner wheel to turn at a slower speed than the outer wheel as the vehicle turns.

Power is transmitted from a vehicle drive-shaft to a pinion gear that is in constant mesh with a differential ring gear. The ring gear is bolted to a differential housing that turns with the ring gear. A differential spider having four (4) support shafts orientated in the shape of a cross, has four (4) differential pinion gears. One pinion gear is supported for rotation on each support shaft. Power is transferred from the differential housing to side gears that are splined to the axle shafts. The side gears are in constant mesh with the side differential pinion gears. The outer ends of the axle shafts are bolted to the brake drum hubs to which the wheels are also bolted.

When the vehicle is driven in a straight path the ring gear, differential housing, spider, and differential pinion gears all rotate as one unit to transfer power to the axle shafts. There is no relative movement between the differential pinion gears and the side gears. When the vehicle turns, the differential pinion gears rotate on their respective shafts to speed up the rotation of one axle shaft while slowing the rotation of the other axle shaft.

Often the differential includes a differential locking mechanism. When there are poor road conditions, i.e., slippery or rough surfaced roads, the locking mechanism allows maximum wheel and tire traction for improved control. If the differential does not have a locking mechanism and one tire is on ice, all of the torque and speed will be transferred to the wheel on ice. Thus, the tire just spins on the ice and the vehicle is prohibited from traveling forward. A locking mechanism allows the axle shafts to rotate at the same speed while transferring all available torque to the tire not on the ice. If the tractive effort at this tire is sufficient, the vehicle can be moved off of the ice. When the differential is locked, power is transmitted through the locked differential housing, gearing, and axle shafts rather than through the differential gearing only.

One type of differential locking mechanism is comprised of a wet disc clutch that locks the differential housing to the axle shafts. The wet disc clutch includes a plurality of stationary discs interspersed with rotating discs in a fluid chamber. A piston applies a force to the wet disc clutch to compress the rotating and stationary discs together to reduce rotational speed and allow the differential housing to be locked to the axle shafts.

One disadvantage with these wet disc clutches is system leakage. The leakage problem results from the pressure transfer from stationary members to rotating members to actuate the piston. Complicated leak-by recapture systems must be incorporated into the differential, which take up valuable packaging space and are expensive. The recapture system recovers the leaked fluid and returns it to a pump that is used for applying pressure to actuate the wet disc clutch. Another disadvantage is that high pressure is required at the input in order to have sufficient pressure at the actuating piston, which requires larger and more expensive pump systems.

Thus, it is desirable to have a simplified actuating mechanism for a differential lock that can deliver pressure from a stationary source to a rotating source while eliminating leakage. It is also desirable for the actuating mechanism to be able to have high pressure at the actuating piston with lower pressure at the input.

SUMMARY OF THE INVENTION

In a disclosed embodiment of this invention, an actuator delivers high pressure from a stationary source to a rotating source in order to actuate a differential locking mechanism. The actuator includes a fluid input, a stationary member with a fluid inlet for receiving fluid from the fluid input, and a rotating member. The rotating member has a fluid outlet and is supported on at least one bearing for rotation with respect to the stationary member. Fluid flows through the inlet to apply an actuating force to the rotating member via the stationary member. This causes the rotating member to displace a pre-determined amount of fluid from the fluid outlet to actuate the differential locking mechanism.

In a preferred embodiment, the differential locking mechanism is incorporated into a drive axle assembly. The drive axle includes an axle housing, a first rotatable axle shaft for driving a first wheel, and a second rotatable axle shaft for driving a second wheel. An axle differential controls rotational speed and torque supplied to the first and second axle shafts. The differential locking mechanism is selectively movable between an unlocked position and a locked position. In the unlocked position the first and second axle shafts can rotate at different speeds from each other, such as when the vehicle turns a corner. In the locked position the axle shafts are locked together for rotation at a common speed. A first volume of fluid applies an actuating force to the rotating member via the stationary member, which causes the rotating member to displace a second volume of fluid. This fluid displacement moves the locking mechanism from the unlocked position to the locked position.

In a further embodiment, the stationary member has a greater diameter than the rotating member does. This is advantageous because high pressure is provided at the locking mechanism with lower pressure at the input.

A preferred method for locking the differential includes steps of providing a stationary member having a fluid inlet, a rotating member having a fluid outlet, and a lock mechanism in fluid communication with the fluid outlet. Additional steps include applying a fluid force to the stationary member via the fluid inlet, actuating the rotating member with the stationary member, displacing fluid with the rotating member to a fluid passageway via the fluid outlet, and applying a fluid force to lock the lock mechanism via the fluid passageway.

These and other features of the present invention can be best understood from the following specification and drawings, the following of which is a brief description.

DETAILED DESCRIPTION OF A PREFERRED EMBODIMENT

Figure 1:
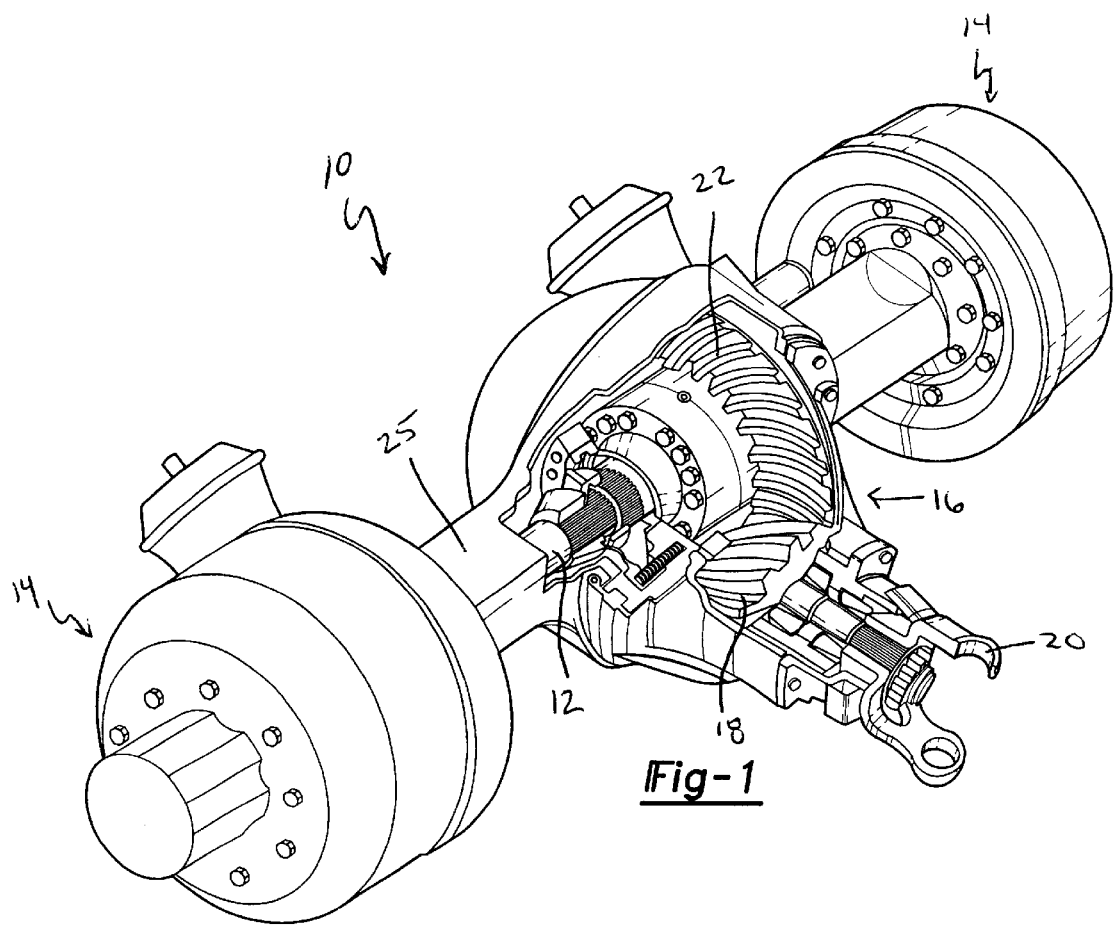
FIG. 1 is a perspective view, partially cut away, of a drive axle assembly.

An axle assembly is shown generally at 10 in FIG. 1. The drive axle 10 includes a pair of axle shafts 12 (only one is shown) for driving vehicle wheels 14. The drive axle 10 uses a differential assembly, generally shown at 16, to control input speed and torque to the axle shafts 12. Under ideal conditions, when the vehicle is driven along a straight path, the wheels 14 will be turning at approximately the same speed and the torque will be equally split between both wheels 14. When the vehicle negotiates a turn, the outer wheel has to travel over a greater distance than the inner wheel. The differential assembly 16 allows the inner wheel 14 to turn more slowly than the outer wheel as the vehicle negotiates the turn.

Figure 2:
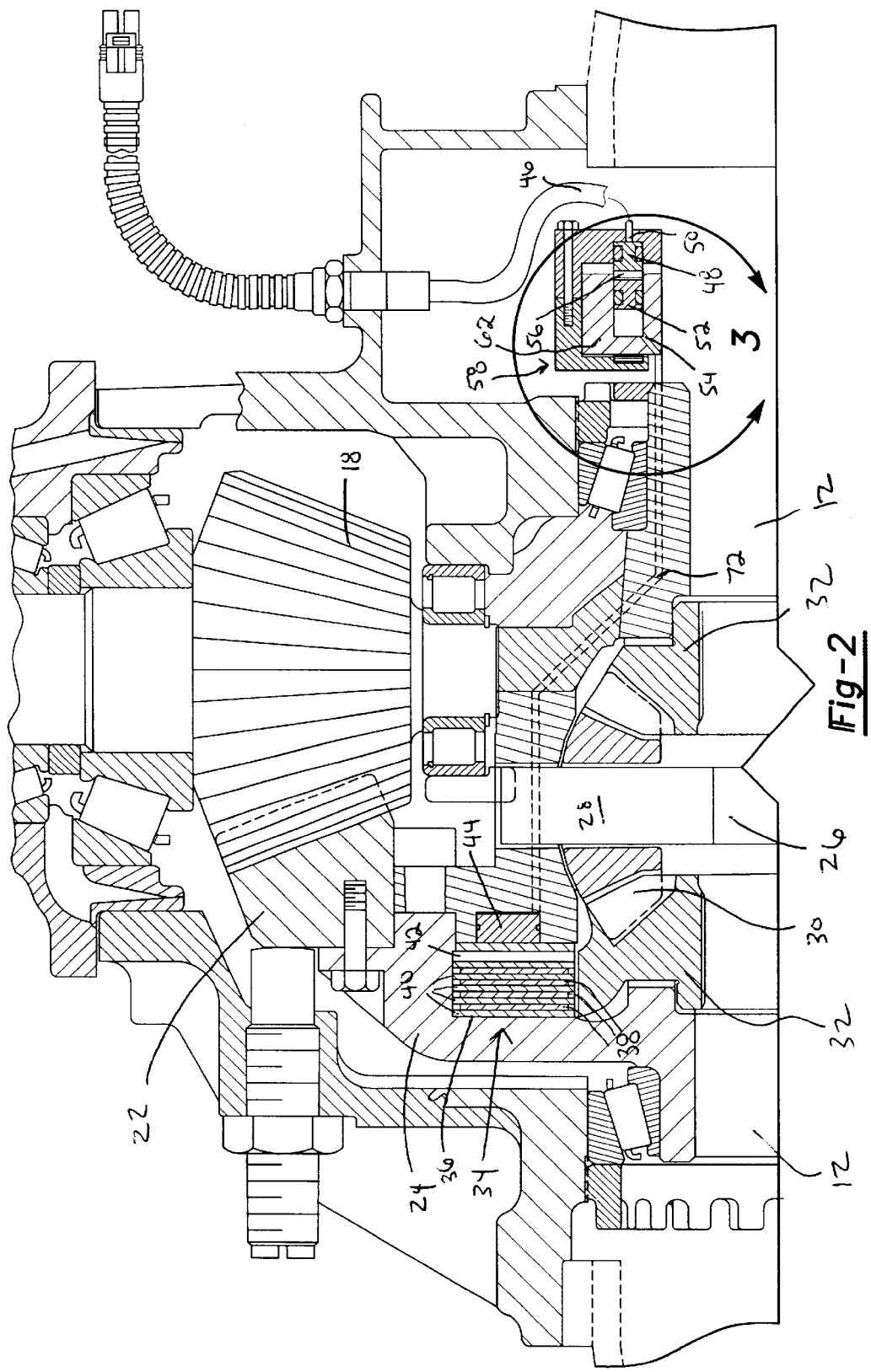
FIG. 2 is a partial cross-sectional view of a differential assembly incorporating the subject invention.

Power is transmitted from an engine and transmission (not shown) to the drive axle 10 via a longitudinally extending driveshaft (not shown). The driveshaft is coupled to a pinion gear 18 with a yoke assembly 20. The pinion gear 18 is in constant mesh with a differential ring gear 22. As shown in FIG. 2, the ring gear 22 is bolted to a differential housing 24 that turns with the ring gear 22.

A differential spider 26 has four (4) support shafts 28 (only one is shown) that are orientated in the shape of a cross. One differential pinion gear 30 is supported for rotation on each support shaft 28. Power is transferred from the differential housing 24 to side gears 32 that are splined to the axle shafts 12. The side gears 32 are in constant mesh with the side differential pinion gears 30. The outer ends of the axle shafts 12 are bolted to the brake drum hubs to which the wheels 14 are also bolted. An axle housing 25 is used to enclose and protect the differential assembly 26, gearing, and axle shafts 12.

When the vehicle is driven in a straight path the ring gear 22, differential housing 24, spider 26, and differential pinion gears 30 all rotate as one unit to transfer power to the axle shafts 12. There is no relative movement between the differential pinion gears 30 and the side gears 32. When the vehicle turns, the differential pinion gears 30 rotate on their respective shafts 28 to speed up the rotation of one axle shaft 12 while slowing the rotation of the other axle shaft 12.

The differential assembly 16 includes a differential locking mechanism, shown generally at 34. Under poor road conditions, i.e., slippery or rough surfaced roads, the locking mechanism 34 provides maximum wheel and tire traction for improved control. The locking mechanism 34 allows the axle shafts 12 to rotate at the same speed while transferring all available torque to the tire positioned on the best friction surface. When the differential assembly 16 is locked, power is transmitted through the locked differential housing 24, gearing, and axle shafts 12 rather than through the differential gearing only.

The locking mechanism 34 is comprised of a wet disc clutch 36 that locks the differential housing 24 to the axle shafts 12. The wet disc clutch 36 reacts between the differential housing 24 and a clutch plate. The wet disc clutch 36 includes a plurality of stationary discs 38 interspersed with rotating discs 40 in a fluid chamber 42. A piston 44 applies a force to the wet disc clutch 36 to compress the rotating 40 and stationary 38 discs together to reduce rotational speed and allow the differential housing 24 to be locked to the axle shafts 12.

The subject invention relates to an actuator that moves the differential locking mechanism 34 between locked and unlocked positions. The actuator includes a fluid input 46, a stationary member 48 having a fluid inlet 50 for receiving fluid from the fluid input 46, and a rotating member 52 having a fluid outlet 54. The rotating member 52 is supported on a bearing 56 for rotation with respect to the stationary member 48. A fluid supply flows through the inlet 50 to apply an actuating force to the rotating member 52 via the stationary member 48. This causes the rotating member 52 to displace a pre-determined amount of fluid from the fluid outlet 54 to actuate the differential locking mechanism 34.

In one embodiment, a housing 58 is used to enclose the stationary 48 and rotating 52 members within the axle 10. The stationary member 48 is preferably a stationary piston that is reciprocatingly received within a first fluid chamber 60 formed within the housing 58. It should be understood that the word "stationary" as applied to the stationary piston, means non-rotating. Thus, the stationary piston does move in a linear direction between actuated and unactuated positions, but the stationary piston does not rotate with respect to the housing 58.

Figure 3:
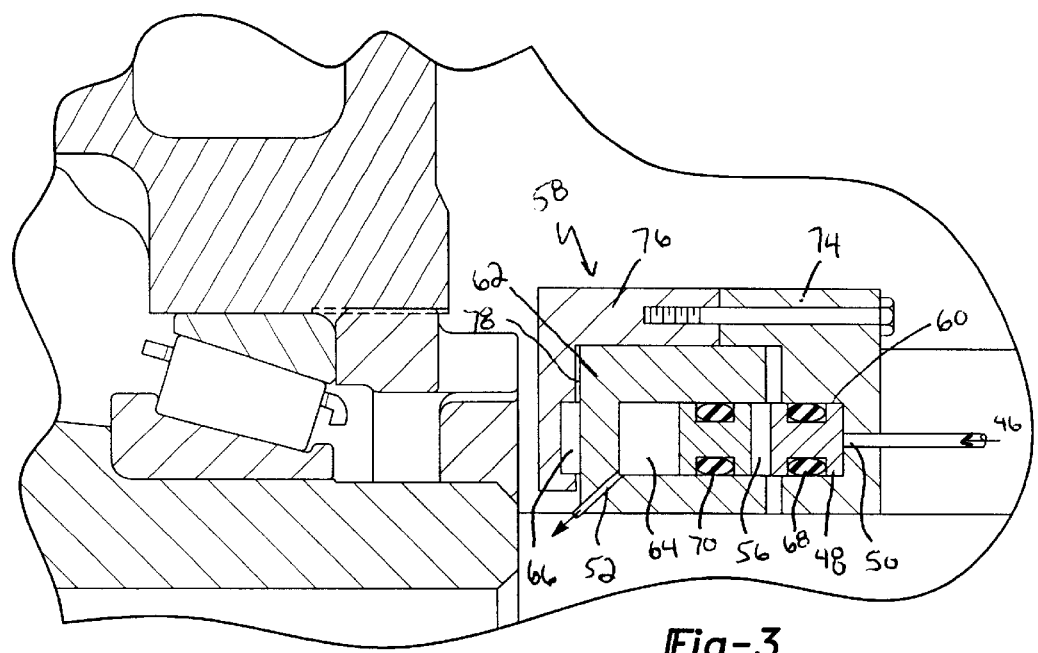
FIG. 3 is an enlargement of a section of the differential assembly as indicated in FIG. 2.

The rotating member 52 is preferably a rotating piston that is mounted within the housing 58 for rotation with respect to the stationary piston 48. As shown in FIG. 3, a sleeve 62 is rotatably supported with respect to the housing 58 and has a second fluid chamber 64 formed within the sleeve 62. The rotating piston 52 is reciprocatingly received within the second fluid chamber 64. The bearing 56 that supports the rotating piston is preferably a thrust bearing that is mounted between and for engagement with the pistons 48, 52 for reciprocal movement therewith. A second bearing 66 is mounted between the housing 58 and the sleeve 62 for rotatably supporting the sleeve 62 with respect to the housing 58.

A stationary seal assembly 68 is used to seal the stationary piston 48 within the first chamber 60 and a rotating seal assembly 70 is used to seal the rotating piston 52 within the second chamber 64 to provide a sealed actuating system as the fluid flows from the fluid input 46 through the fluid inlet 50 to the first chamber 60 and from the second chamber 64 to the fluid outlet 54.

As discussed above, under certain pre-determined conditions, the actuator moves the differential locking mechanism 34 between locked and unlocked positions. The actuator is in fluid communication with the fluid outlet 54 via a fluid passageway 72 (see FIG. 2). Thus, fluid flows through the fluid inlet 50 to apply a force against the stationary member 48 causing the rotating member 52 to displace fluid into the fluid passageway 72 via the fluid outlet 54. The piston 44 adjacent to the wet disc clutch 36 is actuated by a fluid force applied via the fluid passageway 72 to move the wet disc clutch assembly to the locked position. The fluid passageway 72 is preferably a drilled or cast passageway extending through the differential assembly 26.

One such predetermined condition would be when one wheel is supported on a first surface having a first coefficient of friction and the second wheel is supported on a second surface, such as ice, having a second coefficient of friction that is significantly less than the first coefficient of friction. The actuator would then actuate the locking mechanism 34 such that the differential housing 24 is locked to the first and second axle shafts 12. This allows the first and second axle shafts 12 to rotate at a common speed while most of the input torque is transferred to the wheel supported on the surface having the higher coefficient of friction. The actuator can be controlled by mechanical or electrical methods known in the art and can be manually or automatically actuated.

As shown in FIG. 3, the housing 58 includes a first housing portion 74 and a second housing portion 76. The first housing portion 74 has a first recess that defines the first fluid chamber 60 and the second housing portion 76 has a second recess 78 for receiving the sleeve 62. The first 74 and second 76 housing portions are preferably fastened together with fasteners (only one is shown) however, other joining methods could be used.

A preferred method for locking the differential includes steps of providing a stationary member 48 having a fluid inlet 50, a rotating member 52 having a fluid outlet 54, and a lock mechanism 34 in fluid communication with the fluid outlet 54. Additional steps include applying a fluid force to the stationary member 48 via the fluid inlet 50, actuating the rotating member 52 with the stationary member 48, displacing fluid with the rotating member 52 to a fluid passageway 72 via the fluid outlet 54, and applying a fluid force to lock the lock mechanism 34 via the fluid passageway 72.

Figure 4:
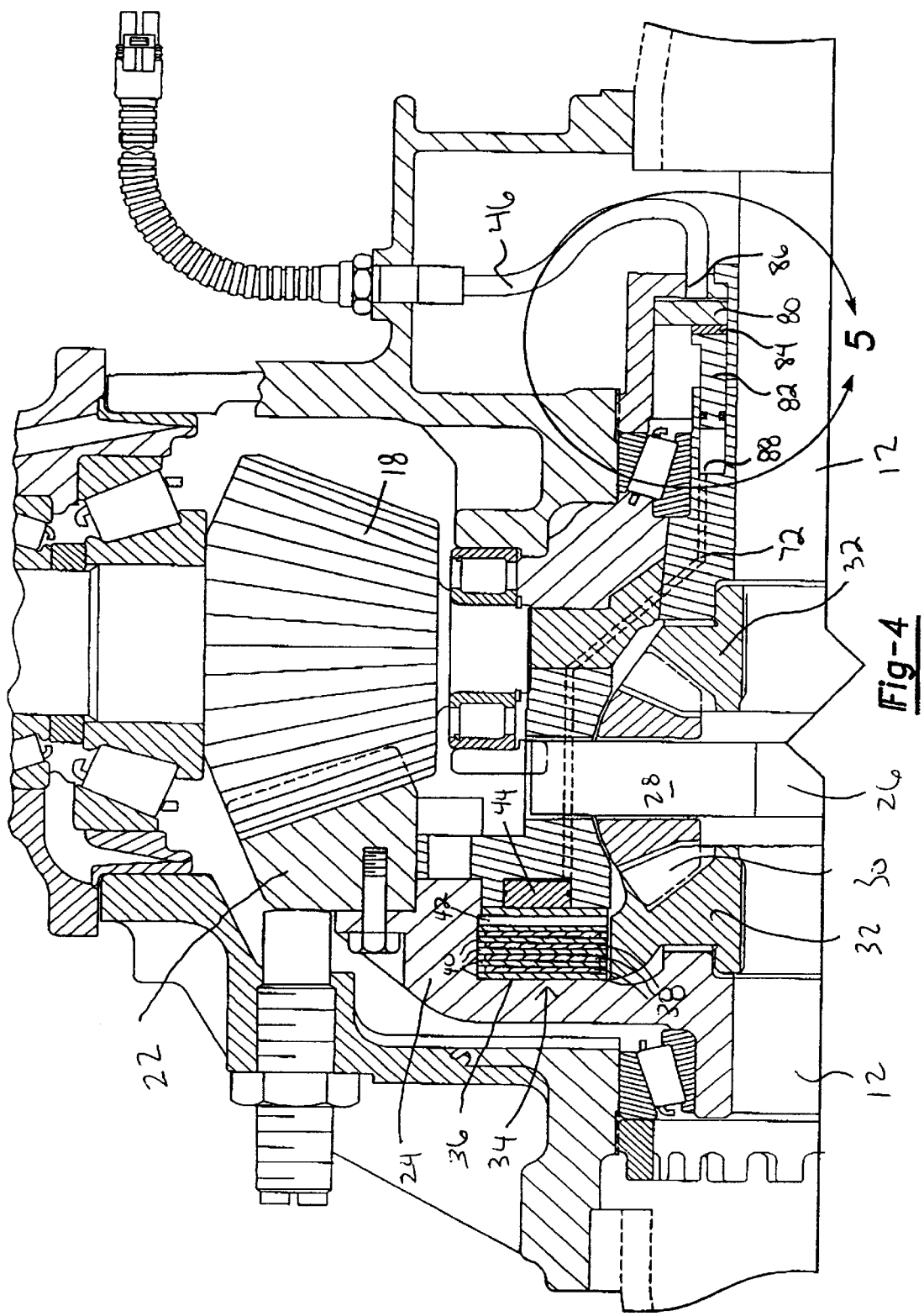
FIG. 4 is a partial cross-sectional view of a differential assembly incorporating an alternative embodiment of the subject invention.
Figure 5:
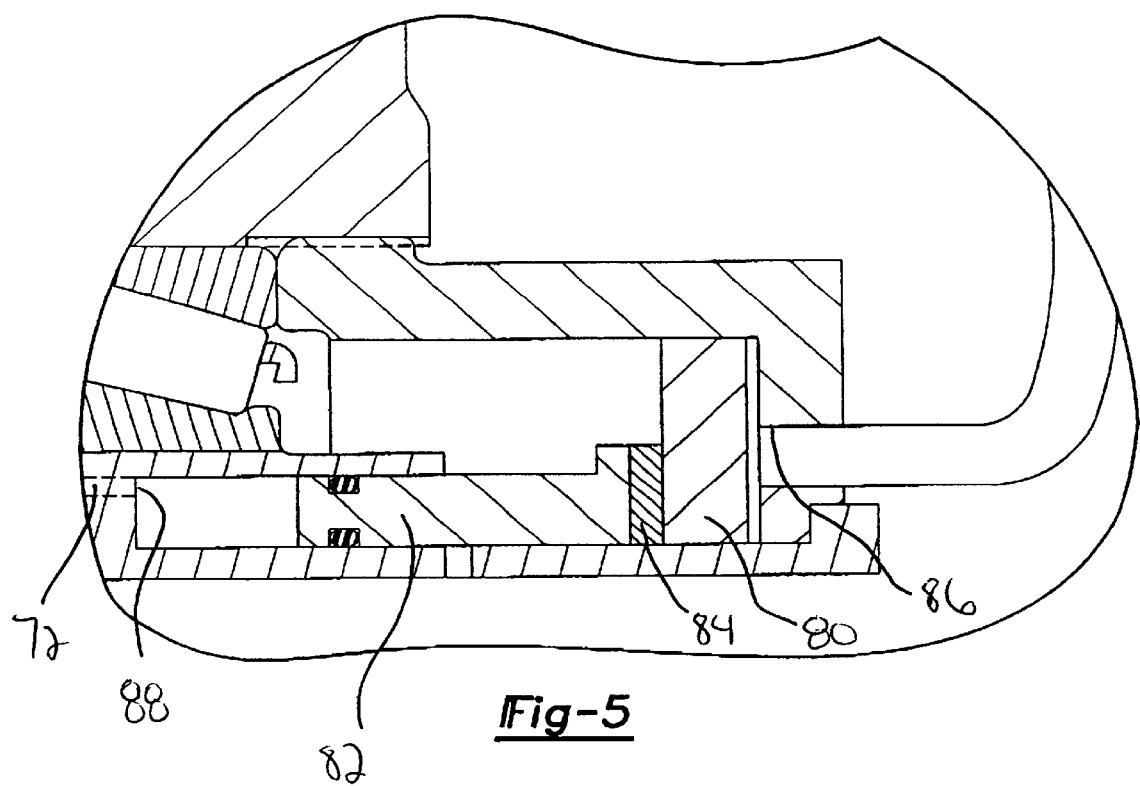
FIG. 5 is an enlargement of a section of the differential assembly as indicated in FIG. 4.

In an alternate embodiment, shown in FIGS. 4 and 5, the actuating mechanism is integrally formed within the differential assembly 16 and does not require a separate housing 58. The actuating mechanism includes a stationary piston member 80 and a rotating piston member 82 that operate in a manner similar to that describe above with regard to members 48, 52. The rotating piston member 82 is supported on a bearing 84 for rotation with respect to the stationary piston member 80. A fluid supply flows through the fluid input 46 to an inlet 86 to apply an actuating force to the rotating piston member 82 via the stationary piston member 80. This causes the rotating piston member 82 to displace a pre-determined amount of fluid from a fluid outlet 88 to actuate the differential locking mechanism 34. Preferably, the stationary piston member 80 has a greater diameter than the rotating piston member 82 such that a high pressure actuating force can be applied to the actuating piston 44 for the locking mechanism 34 with a lower input pressure force.

The subject invention provides a simplified actuating mechanism for a differential lock that can deliver pressure from a stationary source to a rotating source while eliminating leakage. The actuating mechanism is also advantageous because high pressure is provided at the actuating piston 44 with lower pressure at the input 46. For example, an input pressure of 425 psi (pounds per square inch) can be converted to 1500 psi at the actuating piston 44. Varying the actuating 44, rotating 52, and stationary 48 piston sizes and stroke length, as is known in the art, can provide the desired pressure amplification.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. An actuator for a differential locking mechanism comprising:
   a fluid input;
   a stationary member having a fluid inlet for receiving fluid from said fluid input; and
   a rotating member having a fluid outlet and being supported on at least one bearing for rotation with respect to said stationary member wherein said fluid flows through said inlet to apply an actuating force to said rotating member via said stationary member causing said rotating member to displace a predetermined amount of fluid from said fluid outlet to actuate the differential locking mechanism.

2. An actuator as recited in claim 1 including a housing for enclosing said stationary and rotating members.

3. An actuator as recited in claim 2 wherein said stationary member is a first piston reciprocatingly received within a first fluid chamber formed within said housing.

4. An actuator as recited in claim 3 wherein said rotating member is a second piston mounted within said housing for rotation with respect to said first piston.

5. An actuator as recited in claim 4 including a sleeve rotatably supported with respect to said housing, said second piston being reciprocatingly received within a second fluid chamber formed within said sleeve.

6. An actuator as recited in claim 5 wherein said at least one bearing is a first thrust bearing mounted between and engaging said first and second pistons for reciprocal movement therewith.

7. An actuator as recited in claim 6 including a second bearing mounted between said housing and said sleeve for rotatably supporting said sleeve with respect to said housing.

8. An actuator as recited in claim 5 including at least one stationary seal assembly for sealing said first piston within said first chamber and at least one rotating seal assembly for sealing said second piston within said second chamber to provide a sealed actuating system as said fluid flows from said fluid input through said fluid inlet to said first chamber and from said second chamber to said fluid outlet.

9. A differential locking mechanism for a drive axle assembly having a pair of axle shafts comprising:
   a differential housing;
   a stationary member mounted to an axle structure and fixed relative to said differential housing, said stationary member having a fluid inlet;
   a rotating member supported by at least one bearing for rotation with respect to said stationary member and having a fluid outlet;
   a lock member selectively movable between an unlocked position and a locked position where said differential housing is locked for rotation with the axle shafts; and
   an actuator in fluid communication with said fluid outlet via a fluid passageway wherein a fluid flows through said fluid inlet to apply a force against said stationary member causing said rotating member to displace fluid into said fluid passageway via said fluid outlet to move said actuator from said unlocked position to said locked position.

10. A mechanism as recited in claim 9 wherein said stationary member is a first piston reciprocatingly received within a first fluid chamber formed within said axle structure.

11. A mechanism as recited in claim 10 wherein said rotating member is a second piston mounted within said axle structure for rotation with respect to said first piston.

12. A mechanism as recited in claim 11 including a sleeve rotatably supported with respect to said axle structure, said second piston being reciprocatingly received within a second fluid chamber formed within said sleeve.

13. A mechanism as recited in claim 12 wherein said axle structure is a piston housing comprised of a first housing portion having a first recess for receiving said first piston and a second housing portion having a second recess for receiving said sleeve, said first and second housing portions being fastened together with at least one fastener.

14. A mechanism as recited in claim 11 wherein said lock member is comprised of a wet disc clutch assembly reacting between said differential housing and a clutch plate.

15. A mechanism as recited in claim 14 wherein said actuator is a third piston actuated by a fluid force applied via said fluid passageway to move said wet disc clutch assembly to said locked position.

16. A mechanism as recited in claim 11 wherein said first piston has a greater diameter than said second piston.

17. A drive axle assembly comprising:
    an axle housing;
    a first axle shaft rotatably supported with respect to said axle housing for driving a first wheel;
    a second axle shaft rotatably supported with respect to said axle housing for driving a second wheel;
    a differential for controlling rotational speed and torque supplied to said first and second axle shafts;
    a locking mechanism selectively movable between an unlocked position where said first and second axle shafts can rotate at different speeds from each other and a locked position where said axle shafts are locked together for rotation at a common speed; and
    an actuator having a stationary portion and a rotating portion wherein a first volume of fluid applies an actuating force to said rotating member via said stationary member causing said rotating member to displace a second volume of fluid to move said locking mechanism from said unlocked position to said locked position.

18. An assembly as recited in claim 17 including an input pinion gear in meshing engagement with a ring gear, said input pinion and ring gears for supplying input speed and input torque to said differential.

19. An assembly as recited in claim 18 wherein said differential is comprised of a differential housing fixed for rotation with said ring gear and a differential gear assembly including at least one pinion gear in meshing engagement with said first axle shaft and at least one pinion gear in meshing engagement with said second axle shaft.

20. An assembly as recited in claim 19 wherein said locking mechanism is comprised of a wet disc clutch assembly controlled by said actuator to lock said differential housing to said first and second axle shafts when a first predetermined condition is achieved.

21. An assembly as recited in claim 20 wherein said first predetermined condition is defined as said first wheel being supported on first surface having a first coefficient of friction and said second wheel being supported on a second surface having a second coefficient of friction that is significantly less than said first coefficient of friction, said actuator locking said differential housing to said first and second axle shafts such that said first and second axle shafts rotate at a common speed while most of said input torque is transferred to said first wheel.

22. An assembly as recited in claim 19 including an actuator housing having a first recess for receiving said stationary portion and a second recess for receiving said rotating portion.

23. An assembly as recited in claim 22 wherein said rotating portion is comprised of a sleeve rotatably mounted within said second recess of said actuator housing and a first piston reciprocatingly received within said sleeve and said stationary portion is comprised of a second piston reciprocatingly received within said first recess.

24. An assembly as recited in claim 23 wherein said actuator housing includes a fluid inlet for supplying fluid to a first fluid chamber defined by said first recess and wherein said sleeve includes a fluid outlet for receiving fluid from a second fluid chamber defined by said sleeve.

25. An assembly as recited in claim 24 wherein said actuator is a third piston in fluid communication with said fluid outlet via a fluid passageway such that when locking is desirable, a fluid force is applied to said second piston which linearly actuates said first piston causing fluid to be displaced from said second fluid chamber into said fluid passageway via said fluid outlet to apply an actuating force to said third piston to move said locking mechanism to said locked position.

26. A method for locking a differential in a drive axle assembly comprising the steps of:
    providing a stationary member having a fluid inlet, a rotating member having a fluid outlet, and a lock mechanism in fluid communication with the fluid outlet;
    applying a fluid force to the stationary member via the fluid inlet;
    actuating the rotating member with the stationary member;
    displacing fluid with the rotating member to a fluid passageway via the fluid outlet;
    applying a fluid force to lock the lock mechanism via the fluid passageway.

* * * * *